United States Patent
Kilian et al.

(10) Patent No.: US 7,444,389 B2
(45) Date of Patent: Oct. 28, 2008

(54) METHODS AND APPARATUS FOR GENERATING A CONTENT ADDRESS TO INDICATE DATA UNITS WRITTEN TO A STORAGE SYSTEM PROXIMATE IN TIME

(75) Inventors: Michael Kilian, Harvard, MA (US); Stephen Todd, Shrewsbury, MA (US); Tom Teugels, Schoten (BE); Jan Van Riel, Geel (BE); Carl D'Halluin, Kortrijk. (BE)

(73) Assignee: EMC corporation, Hopkinton, MA (US)

( * ) Notice: Subject to any disclaimer, the term of this patent is extended or adjusted under 35 U.S.C. 154(b) by 947 days.

(21) Appl. No.: 10/731,845

(22) Filed: Dec. 9, 2003

(65) Prior Publication Data

US 2005/0144172 A1  Jun. 30, 2005

(51) Int. Cl.
  *G06F 15/16* (2006.01)
(52) U.S. Cl. .................. 709/219; 703/205; 703/215
(58) Field of Classification Search .......... 709/219
  See application file for complete search history.

(56) References Cited

U.S. PATENT DOCUMENTS

| | | | |
|---|---|---|---|
| 5,347,579 A | 9/1994 | Blandford | |
| 6,601,090 B1 * | 7/2003 | Gurijala et al. | 709/213 |
| 6,807,632 B1 | 10/2004 | Carpentier et al. | |
| 7,062,570 B2 * | 6/2006 | Hong et al. | 709/238 |
| 2002/0196685 A1 | 12/2002 | Topham | |
| 2004/0030806 A1 | 2/2004 | Pandya | |
| 2005/0091469 A1 * | 4/2005 | Chiu et al. | 711/203 |

FOREIGN PATENT DOCUMENTS

| | | |
|---|---|---|
| CA | 2121852 A1 | 1/2004 |
| EP | 0 881 580 A2 | 12/1998 |
| EP | 0 940 945 A2 | 9/1999 |
| EP | 0 881 580 A3 | 2/2002 |
| GB | 2379059 A | 2/2003 |
| JP | 08-030497 | 2/1996 |
| JP | 11-143605 | 5/1999 |
| WO | WO 92/03000 A1 | 2/1992 |
| WO | WO 99/13415 A1 | 3/1999 |

OTHER PUBLICATIONS

Tolia, et al. "Opportunistic use of content addressable storage for distributed file system," In Proc. of USENIX Technical Conference, pp. 127-140, Jun. 2003.*
First Examination Report from Indian Patent Office.
British Search Report.

* cited by examiner

*Primary Examiner*—Jason Cardone
*Assistant Examiner*—Nicholas Taylor
(74) *Attorney, Agent, or Firm*—Krishnendu Gupta; Penelope S. Wilson (57) ABSTRACT

One embodiment is a system for locating content on a storage system, in which the storage system provides a location hint to the host of where the data is physically stored, which the host can resubmit with future access requests. In another embodiment, an index that maps content addresses to physical storage locations is cached on the storage system. In yet another embodiment, intrinsic locations are used to select a storage location for newly written data based on an address of the data. In a further embodiment, units of data that are stored at approximately the same time having location index entries that are proximate in the index.

18 Claims, 7 Drawing Sheets

Figure 1

Prior Art

Figure 2

Prior Art

METHODS AND APPARATUS FOR GENERATING A CONTENT ADDRESS TO INDICATE DATA UNITS WRITTEN TO A STORAGE SYSTEM PROXIMATE IN TIME

BACKGROUND OF INVENTION

1. Field of Invention

The present invention relates to methods and apparatus for accessing content in a storage system.

2. Description of the Related Art

Content Addressed Storage (CAS) is a technique by which a unit of data stored on a storage system is accessed using an address that is derived from the content of the unit of data. As an example, the unit of data may be provided as an input to a hashing function which generates a hash value that is used as the content address for the unit of data. An example of a hashing function suitable for generating content addresses is the message digest 5 (MD5) hashing algorithm. When a host computer sends a request to a content-addressable storage system to retrieve a unit of data, the host provides the content address (e.g., hash value) of the unit of data. The storage system then determines, based on the content address, the physical location of the unit of data in the storage system, retrieves the unit of data from that location, and returns the unit of data to the host computer.

The task of determining the physical location of the unit of data may involve several aspects, particularly when the storage system is a distributed storage system. A distributed storage system is one made up of a number of separate nodes, where each node may be a separate machine with separate resources (e.g., processor, memory, disk). The nodes communicate with each other (e.g., through a network) to handle data access requests from one or more host computers. To determine the physical location of a unit of data on the storage system based on the content address of the unit of data, the storage system first determines on which node the unit of data is stored. Then, the storage system determines which disk on that node the unit of data is stored (if the node has multiple disks), as well as the physical location on the disk at which the unit of data is stored (e.g., cylinder, head, sector).

Figure 1:
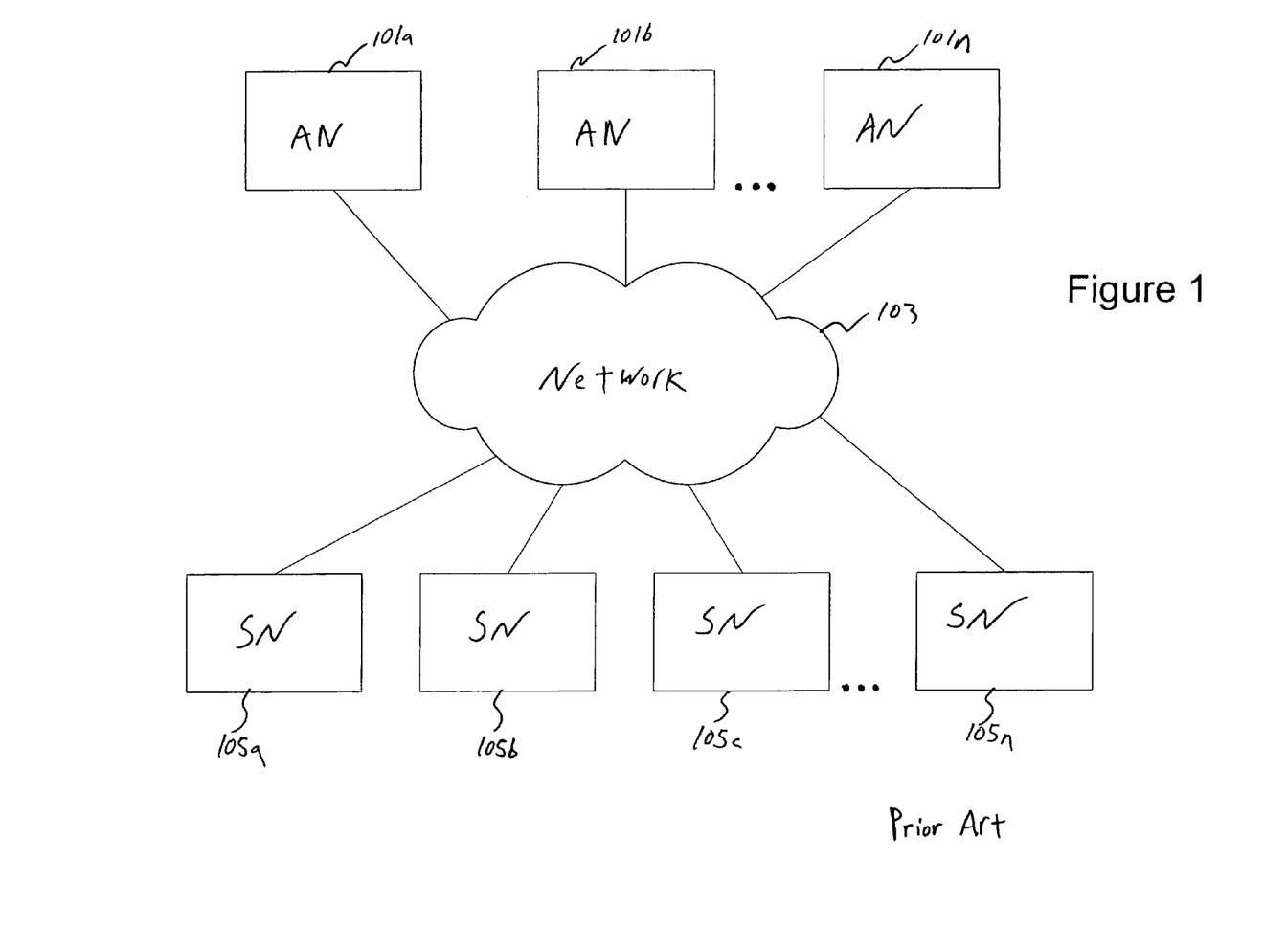
FIG. 1 is a block diagram of an illustrative prior art distributed storage system.

FIG. 1 shows an example of a distributed storage system. The distributed storage system includes a plurality of access nodes (AN) 101*a*, 101*b*, . . . , 101*n*, a plurality of storage nodes (SN) 105*a*, 105*b*, 105*c*, . . . , 105*n*, and a network 103 that couples them together. Access nodes 101 may be used to process access requests (e.g., read/write requests) from host computers (not shown), while storage nodes 105 may be used to store data. When an access node receives a request from a host to read a unit of data, the access node determines on which storage node(s) the unit of data is stored, and requests the unit of data from the appropriate storage node(s).

One known method of determining which storage node stores a particular unit of data is referred to herein as a multicast location query (MLQ). In a multicast location query, an access node 101 receives a request to access a unit of data from a host. The access node then broadcasts a network message to each storage node 105, asking if the storage node stores the particular unit of data. Each storage node 105 then determines if the requested unit of data is stored thereon. Each storage node 105 may include a data set (e.g., a database or table) that lists the content addresses of the units of data stored on that storage node, along with the disk in the storage node on which the unit of data is stored. That is, if the storage node has four disks, the table may indicate on which of the four disks each unit of data is stored. Thus, when a storage node 105 receives the MLQ network message from an access node 101, the storage node may scan its data set to determine if the requested unit of data is stored thereon.

Once a storage node 105 determines that it stores the requested unit of data, the storage node, using the same data set, may determine on which physical disk the unit of data is stored. Then, the storage node may determine the physical location on the appropriate disk at which the unit of data is stored. The units of data may be stored as files in a file system on the storage node. Thus, to determine the physical disk location of a unit of data, the storage node may locate the corresponding file in the file system that includes the data unit and rely on the storage node's operating system to map the file system location to a physical disk location. For example, when storing a unit of data, the storage node may create a file having the content address of the unit of data as its filename and store the unit of data in that file.

Figure 2:
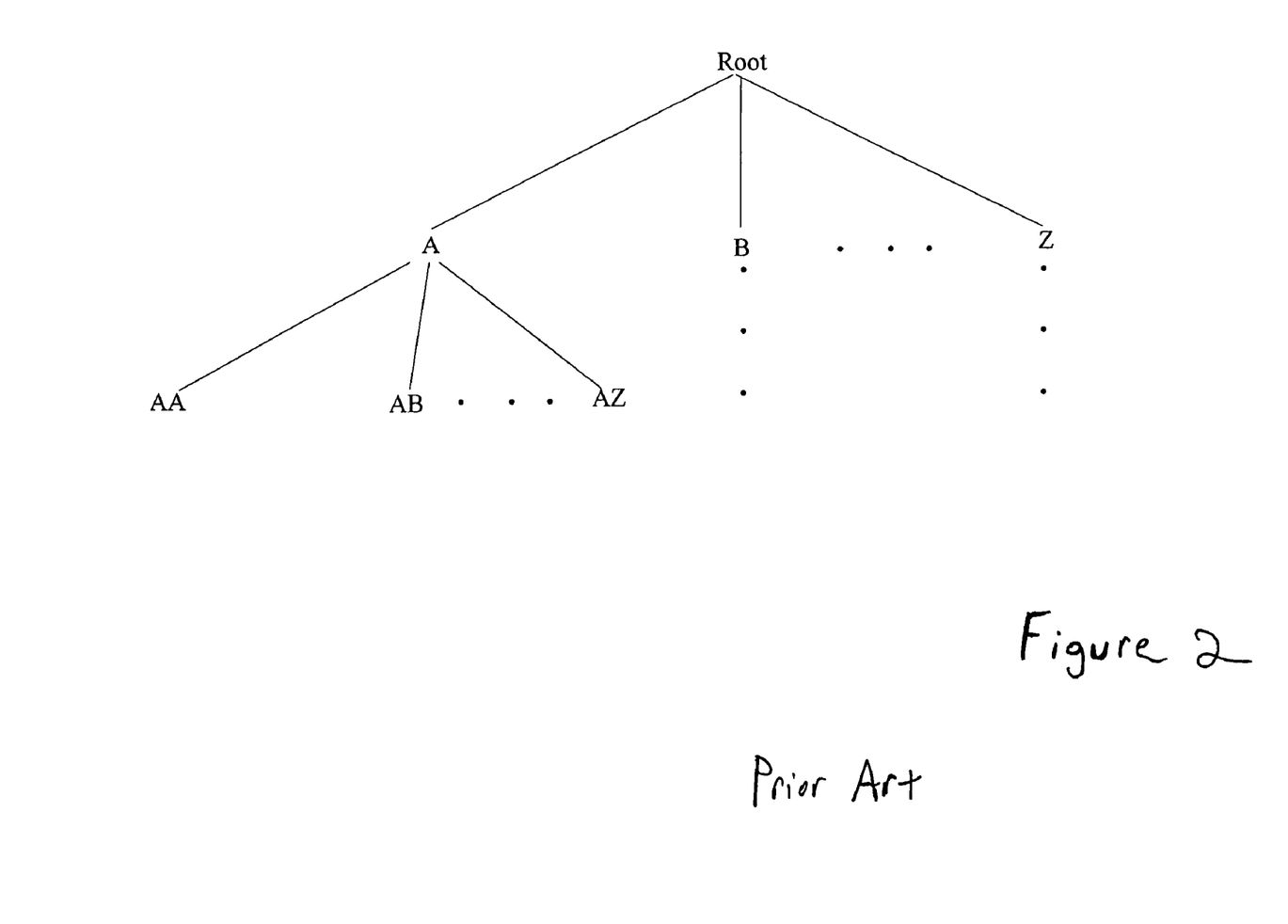
FIG. 2 is a diagram of a file system hierarchy in which units of data are stored in a prior art content-addressable storage system.

FIG. 2 is an illustrative file system for storing units of data in a distributed content-addressable storage system. The file system of FIG. 2 includes a number of hierarchical directories. The directory at the top of the hierarchy is termed the root directory. At the second level in the hierarchy are a number of subdirectories. Each of these subdirectories represents the first character in the content address of a unit of data. That is, a unit of data having a content address beginning with the character 'A' will be stored in one of the subdirectories of directory 'A.' The subdirectory in which the unit of data will be stored is dependent on the second character of the content address. When the storage system later attempts to access the unit of data (e.g., in response to a read request), the storage system may locate the unit of data by traversing the file system hierarchy to locate the subdirectory whose name matches the first two characters of the content address of the unit of data. If the storage system locates the unit of data in its file system, it may open the file containing the unit of data to verify that the storage node does indeed have the unit of data stored thereon. Then, the storage node may return the unit of data to the access node that issued the multicast request. The access node may then return the unit of data to the host that requested the unit of data.

An MLQ is a computationally expensive process, as it requires each storage node to perform an exhaustive database search for each unit of data requested. Further, most of these exhaustive searches will fail, as a unit of data typical resides on only one or a small number of storage nodes (assuming the unit of data is replicated on one or more storage nodes).

To reduce the computational expense of using an MLQ to locate units of data on the storage system, another technique has been developed that employs an index to locate units of data. The index is referred to herein as a blob location index (BLI), with the term "blob" referring to a unit of data The BLI is a database that maps the content addresses of units of data ("blobs") to the storage node or nodes on which the content is stored. In much the same manner as in the MLQ scheme, units of data are stored in a location in the file system selected based on the content address of the unit of data. However, the administration of the BLI is split among the storage nodes, so that each storage node administers a portion of the BLI. Thus, access requests for a unit of data need not be broadcast to all storage nodes, but just to the one that administers the portion of the BLI that includes the requested unit of data.

Figure 3:
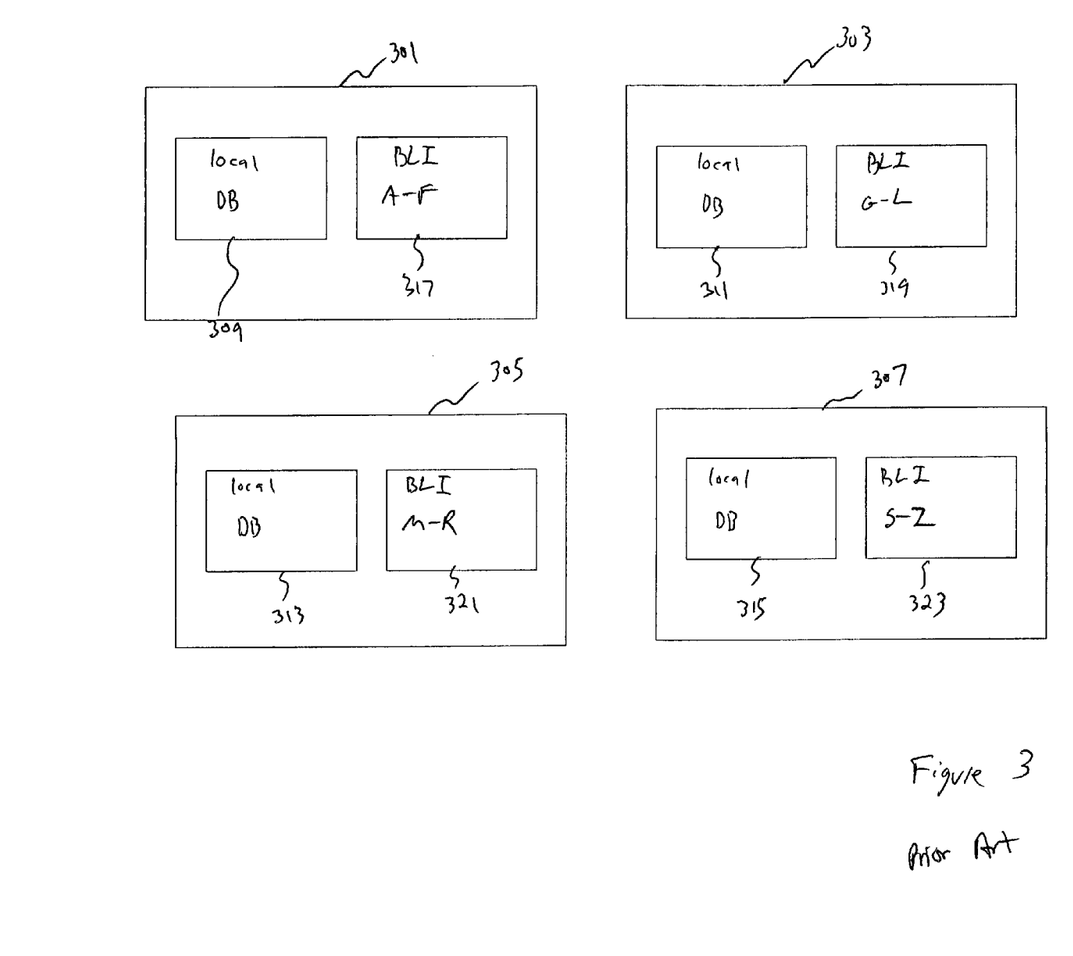
FIG. 3 is a block diagram illustrating a blob location index shared among multiple storage nodes in a prior art content-addressable storage system.

A configuration of the BLI is shown in FIG. 3. The responsibility of administering the BLI is split evenly across storage nodes 301, 303, 305, and 307. Storage node 301 administers the portion of the BLI that contains content addresses beginning with characters 'A'-'F', storage node 303 administers the portion of the BLI that contains content addresses beginning with characters 'G'-'L', storage node 305 administers the portion of the BLI that contains content addresses beginning with characters 'M'-'R', and storage node 307 administers the portion of the BLI that contains content addresses beginning with characters 'S'-'Z'. Each portion of the BLI includes an entry for every content address within the specified range that is stored on the storage system, and indicates on which storage node the corresponding unit of data is stored. The storage nodes also have local databases 309, 311, 313, and 315, which store the content addresses of units of data stored on their respective storage nodes and indicate on which physical disk of that storage node these content addresses are stored.

The access nodes maintain a record of which portions of the BLI are administered by each storage node. Thus, when an access node receives a request from a host to retrieve a particular unit of data, the access node determines which storage node administers the portion of the BLI that contains the content address of the requested unit of data. For example, if a host sends a request to an access node for a unit of data having a content address beginning with 'S', the access node queries storage node 307 to determine which storage node stores the requested unit of data. Storage node 307 searches the BLI to determine which storage node or nodes store the requested unit of data and returns this information to the requesting access node. The access node may request the unit of data directly from the appropriate storage node. In this manner, other storage nodes that do not store the unit of data are not queried. Thus, unlike an MLQ, using the BLI does not require each storage node to perform an exhaustive database search. Instead, only one storage node queries the BLI, and one storage node queries its local database, thereby reducing the overall computational expense on the storage system.

In case of a failure in the BLI to return the storage node for a requested unit of data (i.e., if a content address requested by a host is not found in the BLI), the storage system may fall back on the MLQ scheme, and issue an MLQ to determine on which storage node the unit of data corresponding to the requested content address resides.

By distributing the BLI administration responsibilities evenly among the storage nodes, the computational burden of locating a particular unit of data on the storage system is shared equally among the storage nodes. The randomness of the hashing function used to generate the content addresses is relied upon to distribute an approximately equal number of content addresses to each storage node. When new storage nodes are added to the storage system or when storage nodes are removed from the storage system, the administration responsibilities of the BLI are redistributed among the storage nodes so that the administration responsibilities are evenly shared among all the storage nodes. Further, when new units of data are stored on the storage system, the storage node updates the BLI, updates the local database of the storage node on which the unit of data is stored, and writes the content itself to the storage system. This three-tiered write impacts the performance of the storage system in processing writes.

SUMMARY OF INVENTION

One illustrative embodiment is directed to a method of processing data in a computer system comprising at least one host and at least one storage system which stores data for the at least one host. The method comprises acts of: (a) receiving, at the storage system, a request from the at least one host to access a unit of data stored on the at least one storage system; and (b) in response to the request, returning to the at least one host information related to where the unit of data is physically stored on the at least one storage system. Another illustrative embodiment is directed to at least one computer readable medium encoded with instructions that, when executed on a computer system, perform the above-described method.

A further illustrative embodiment is directed to a storage system for use in a computer system that includes at least one host, wherein the storage system stores data for the at least one host. The storage system comprises: at least one storage device to store data received from the at least one host; and at least one controller that: receives a request from the at least one host to access a unit of data stored on the content addressable storage system, the request identifying the unit of data using a content address, and in response to the request, returns to the at least one host information related to where the unit of data is physically stored on the content addressable storage system.

Another illustrative embodiment of the invention is directed to a method of processing data in a computer system comprising at least one host and at least one storage system which stores data for the at least one host. The method comprises acts of: (a) sending, to the at least one storage system, a request to access a unit of data stored on the storage system; and (b) receiving, from the at least one storage system, information related to where the unit of data is physically stored on the at least one storage system. Another illustrative embodiment is directed to at least one computer readable medium encoded with instructions that, when executed on a computer system, perform the above-described method.

A further illustrative embodiment is directed to a host computer for use in a computer system that includes the host computer and at least one storage system, wherein the host computer accesses data stored on the at least one storage system. The host computer comprises: at least one storage device; and at least one controller that: sends, to the at least one storage system, a request to access a unit of data stored on the at least one storage system; and in response to the request, receives from the at least one storage system, information related to where the unit of data is physically stored on the at least one storage system and stores the information in the at least one storage device.

Another illustrative embodiment is directed to a method of processing data in a computer system comprising at least one host and at least one storage system. The method comprises acts of: (a) receiving, at the at least one storage system, a request from the at least one host to access a unit of data, the request having an identifier that can be used to access the unit of data; and (b) in response to the request, returning to the at least one host an identifier that can be used to access the unit of data and additional information, separate from the identifier, related to where the unit of data is physically stored on the at least one storage system. Another illustrative embodiment is directed to at least one computer readable medium encoded with instructions that, when executed on a computer system, perform the above-described method.

A further illustrative embodiment is directed to a storage system for use in a computer system, including the storage system and at least one host. The storage system comprises: at least one storage device to store data received from the at least one host; and at least one controller that: receives, at the at least one storage system, a request from the at least one host to access a unit of data, the request having an identifier that can be used to access the unit of data; and in response to the request, returns to the at least one host an identifier that can be used to access the unit of data and additional information, separate from the identifier, related to where the unit of data is physically stored on the at least one storage system.

Another illustrative embodiment is directed to a method of processing data in a computer system comprising at least one host and at least one storage system. The method comprises acts of: (a) sending, to the at least one storage system, a request from the at least one host to access a unit of data, the request having an identifier that can be used to access the unit of data; and (b) receiving, from the at least one storage system, an identifier that can be used to access the unit of data and additional information, separate from the identifier, related to where the unit of data is physically stored on the at least one storage system. Another illustrative embodiment is directed to at least one computer readable medium encoded with instructions that, when executed on a computer system, perform the above-described method.

A further illustrative embodiment is directed to a host computer for use in a computer system including the host computer and at least one storage system. The host computer comprises: at least one storage device; and at least one controller that: sends, to the at least one storage system, a request from the at least one host to access a unit of data, the request having an identifier that can be used to access the unit of data; and in response to the request, receives from the at least one storage system an identifier that can be used to access the unit of data and additional information, separate from the identifier, related to where the unit of data is physically stored on the at least one storage system, and stores the additional information on the at least one storage device.

Another illustrative embodiment is directed to a method of processing data in a computer system comprising at least one host and at least one content addressable storage system which stores data for the at least one host, wherein the at least one host accesses data units stored on the at least one storage system using content addresses generated based on the content of the data units. The method comprises: (a) maintaining at least one index that maps a content address of at least one data unit to a storage location within the at least one storage system at which the data unit is stored; and (b) maintaining a cache of the location index. Another illustrative embodiment is directed to at least one computer readable medium encoded with instructions that, when executed on a computer system, perform the above-described method.

A further illustrative embodiment is directed to a content addressable storage system for use in a computer system, that includes the content addressable storage system and at least one host, wherein the at least one host accesses data units stored on the content addressable storage system using content addresses generated based on the content of the data units. The content addressable storage system comprises: at least one storage device to store data received from the at least one host; and at least one controller that: maintains at least one index that maps a content address of at least one data unit to a storage location within the content addressable storage system at which the data unit is stored; and maintains a cache of the location index.

Another illustrative embodiment is directed to a method of processing data in a computer system comprising at least one host and at least one content addressable storage system which stores data for the at least one host, wherein the at least one host accesses data units stored on the at least one storage system using content addresses generated based on the content of the data units. The method comprises an act of: (a) in response to an access request from the at least one host computer for a unit of data identified by a content address, parsing the content address to determine at least one aspect of a physical storage location for the unit of data on the at least one storage system. Another illustrative embodiment is directed to at least one computer readable medium encoded with instructions that, when executed on a computer system, perform the above-described method.

A further illustrative embodiment is directed to a content addressable storage system for use in a computer system, including the content addressable storage system and at least one host, wherein the at least one host accesses data units stored on the content addressable storage system using content addresses generated based on the content of the data units. The content addressable storage system comprises: at least one storage device to store data received from the at least one host; and at least one controller that, in response to an access request from the at least one host computer for a unit of data identified by a content address, parses the content address to determine at least one aspect of a physical storage location for the unit of data on the at least one storage system.

Another illustrative embodiment is directed to a method of processing data in a computer system comprising at least one host and at least one content addressable storage system which stores data for the at least one host, wherein the at least one host accesses data units stored on the at least one storage system using content addresses generated based on the content of the data units. The method comprises acts of: (a) receiving, from the host, a request to store a unit of data on the storage system, the unit of data having a content address based on the content of the unit of data; (b) determining, based on the content address, a first storage location on the storage system to which the content address maps;

(c) storing a pointer for the first unit of data at the first storage location, the pointer pointing to a second storage location; and (d) storing the unit of data at the second storage location on the storage system. Another illustrative embodiment is directed to at least one computer readable medium encoded with instructions that, when executed on a computer system, perform the above-described method.

A further illustrative embodiment is directed to a content addressable storage system for use in a computer system that includes at least one host, wherein the at least one host accesses data units stored on the content addressable storage system using content addresses generated based on the content of the data units. The content addressable storage system comprises: at least one storage device to store data received from the at least one host; and at least one controller that: receives, from the host, a request to store a unit of data on the storage system, the unit of data having a content address based on the content of the unit of data; determines, based on the content address, a first storage location on the storage system to which the content address maps; stores a pointer for the first unit of data at the first storage location, the pointer pointing to a second storage location; and stores the unit of data at the second storage location on the storage system.

Another illustrative embodiment is directed to a method of processing data in a computer system comprising at least one host and at least one content addressable storage system which stores units of data for the at least one host, wherein the at least one host accesses a unit of data using a content address based at least in part on the content of the unit of data. The method comprises an act of: (a) creating the content addresses for units of data to comprise first information that provides an indication of which units of data are written to the storage system proximate in time. Another illustrative embodiment is directed to at least one computer readable medium encoded with instructions that, when executed on a computer system, perform the above-described method.

A further illustrative embodiment is directed to a host computer for use in a computer system comprising the host computer and a content addressable storage system, wherein the host computer accesses the data on the content addressable storage system using content addresses generated based on the content of the data units. The host computer comprises: at least one processor that generates the units of data; and at least one controller that creates the content addresses for units of data to comprise first information that provides an indication of which units of data are written to the content addressable storage system proximate in time.

Another illustrative embodiment is directed to a method of processing data in a computer system comprising at least one host and at least one content addressable storage system which stores units of data for the at least one host, wherein the at least one host accesses a unit of data using a content address based at least in part on the content of the unit of data, wherein the at least one storage system comprises an index that maps content addresses for units of data to storage locations within the at least one storage system where the units of data are stored. The method comprises acts of: (a) receiving, from the at least one host, a request to store one of the units of data, the request identifying the one of the units of data with its associated content address; and (b) storing the one of the units of data in a storage location selected so that an entry in the index for the storage location is proximate to entries in the index for other units of data written to the at least one storage system proximate in time to the one of the units of data. Another illustrative embodiment is directed to at least one computer readable medium encoded with instructions that, when executed on a computer system, perform the above-described method.

A further illustrative embodiment is directed to a content addressable storage system for use in a computer system that comprises the content addressable storage system and at least one host, wherein the at least one host accesses data units stored on the content addressable storage system using content addresses generated based on the content of the data units. The content addressable storage system comprises: at least one storage device to store data received from the at least one host; and at least one controller that maintains an index that maps content addresses for units of data to storage locations within the at least one storage system where the units of data are stored so that units of data written to the at least one storage system proximate in time have proximate entries in the index.

DETAILED DESCRIPTION

Aspects of the present invention relate to improved techniques for accessing content in a storage system.

In accordance with one embodiment of the present invention, the storage system may provide hints to the host as to the location where a unit of data is stored within the storage system. On subsequent access requests to the unit of data, the host can provide the location hint back to the storage system, to facilitate the storage system locating the unit of data, and thereby increase the efficiency of the storage system in locating the unit data.

In an alternate embodiment of the present invention, a content-addressable storage system is provided with an index that maps a content address of at least one unit of data to a storage location at which the unit of data is stored. The storage system maintains a cache of the location index to achieve performance improvements in accessing the information contained within the index.

In a further embodiment of the present invention, a technique is employed for facilitating the processing of a request from a host to access a unit of data in a content-addressable storage system. The technique includes parsing the content address to determine at least one aspect of a physical storage location at which the unit of data is stored. By employing at least one aspect of the content address to be determinative of at least one aspect of the physical storage location wherein the unit of data can be stored, locating a unit of data in response to an access request can be achieved efficiently, as discussed below.

In another embodiment of the present invention, a technique is employed to create content addresses for units of data, such that the content addresses include information that provides an indication of which units of data were written to the storage system proximate in time. As will be appreciated from the discussion below, providing content addresses that have some similarity in at least a portion thereof for units of data that are written proximate in time can increase efficiencies in a storage system locating units of data in response to access requests from a host.

As should be appreciated from the foregoing, several of the aspects of the present invention are specifically directed to content-addressable storage systems. However, this is not true for other aspects of the present invention, which have broader applications. Thus, although the specific implementations described below relate particularly to a content-addressable storage system, it should be appreciated that all aspects of the present invention are not limited in this respect, as they can be employed on other types of storage systems.

Figure 4:
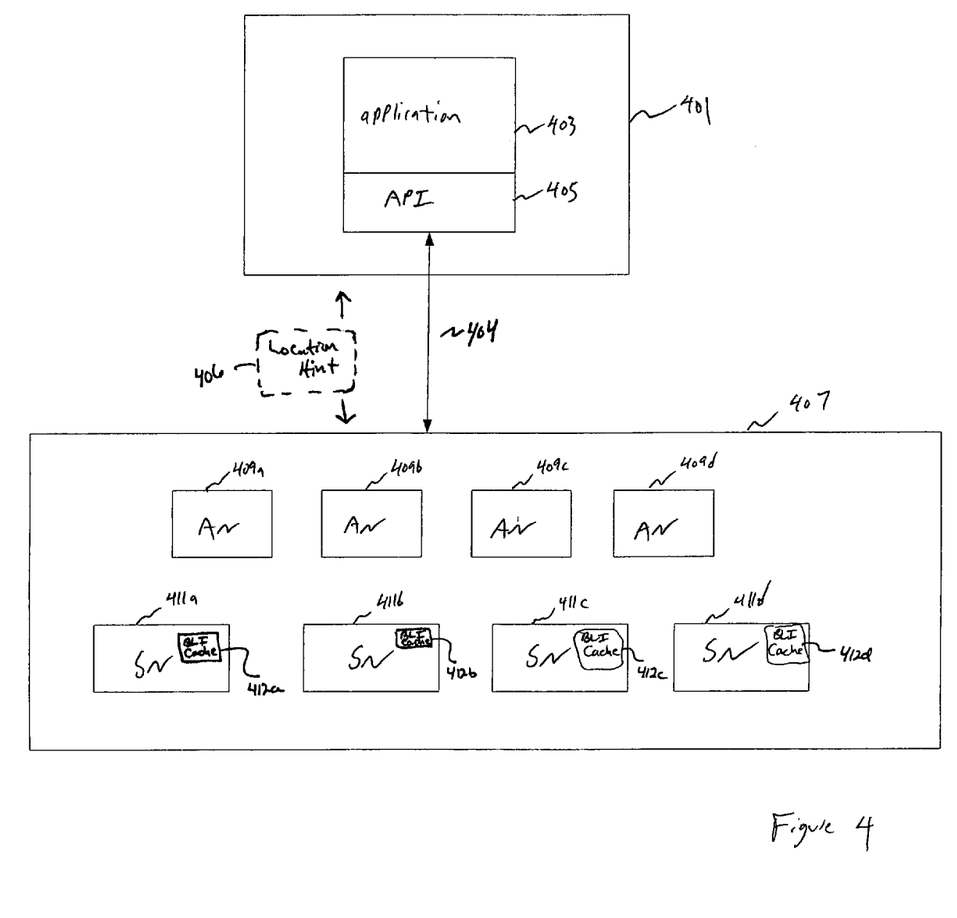
FIG. 4 is a block diagram illustrating a storage system and host configuration on which aspects of the invention can be implemented.

An illustrative computer system configuration on which aspects of the present invention can be employed is shown in FIG. 4, which illustrates a host computer 401 coupled to a storage system 407.

Host computer 401 executes an application program 403 that reads and writes units of data, and an application programming interface (API) 405 that is adapted to interface with the storage system 405. Host 401 may be, for example, a server that provides resources (e.g., data storage, email, and other services), a client (e.g., a general-purpose computer system operated by a user), a network component (e.g., a switch) or any other type of computer. Host 401 is coupled by a communication link 404 to storage system 407 so that the host 401 can use the storage system 407 to store and retrieve data. The link 404 can be any type of communication link, including any type of network or direct connection.

Application 403 may be any computer application program that a user or administrator of host 401 uses and that stores data to and/or retrieves data from storage system 407. Application program 403 is linked with API 405 so that application program 403 may use API 405 to communicate with storage system 407.

API 405 may include, for example, computer object code that is provided to the programmer of application program 403. The computer object code includes routines that may be used to communicate with the storage system. When linked with API 405, an application program may call these routines to communicate with storage system 407. API 405 may be linked with any number of applications, and shields the programmer of application program 403 from the internal protocol by which storage system 407 communicates. It should be appreciated that the aspects of the present invention described herein are not limited to use in a system that employs an API on the host specifically dedicated to facilitating communication between the host 401 and the storage system 407, as the nature of the host/storage system interface can be implemented in any of numerous ways, as the present invention is not limited to any particular implementation technique. As an example of one alternative implementation, application 403 can be customized to communicate directly with the storage system 407.

In one embodiment of the invention, storage system 407 may be a content addressable storage (CAS) system of the type described in commonly assigned co-pending applications Ser. No. 09/236,366, entitled "Content Addressable Information Encapsulation, Representation, and Transfer", filed Jan. 21, 1999; Ser. No. 09/235,146 entitled "Access to Content Addressable Data Over A Network", filed Jan. 21, 1999; Ser. No. 09/391,360, entitled System and Method for Secure Storage, Transfer and Retrieval of Content Addressable Information, filed Sep. 7, 1999; and the application entitled "Method And Apparatus For Data Retention In A Storage System", filed on even date herewith, and not yet assigned a serial number, each of which is incorporated herein by reference. These applications relate to content addressable storage (CAS) and are referred to collectively as "the CAS applications".

As discussed above, in a content-addressable system, data is stored using a content address generated based upon the content of the data itself. The content address may be generated by applying a hash function to the data to be stored. The output of the hash function may be used as at least part of the content address used in communication between the host and storage system to refer to the data. The content address can be mapped (e.g., within the storage system 407) to one or more physical storage locations within the storage system.

One example of a hash function that may be used to generate the content address is message digest 5 (MD5). The content address can correspond directly to the result of the hash of the content, or additional information can be added to the hash result to generate the address. It should be understood that any type of hash function may be used, as the aspects of the invention described herein are not limited to the use of any particular type of hash function, and some aspects are not even limited to use in a content addressable system.

In one embodiment of the invention, a guaranteed unique identifier (GUID) may be added to one or more of the hash results to ensure that the content addresses for units of data are unique. The GUID may be generated, for example, based on the MAC address of the host computer that generates the content address, a timestamp, and a random number, or in any other suitable manner. One example for generating GUIDs that may be used in embodiments of the present invention is described in the International Standards Organization (ISO) specification ISO/IEC 11578:1996.

When a host sends data to the storage system to be stored therein, both the host and the storage system may independently compute the content address of the data. The host may retain the content address for future use to retrieve the data from the storage system. Alternatively, only the storage system may compute the content address and return the computed content address to the host for later use in accessing the data. As yet another alternative, both the storage system and the host may compute the content address, and the storage system can return its generated content address to the host. The host can compare its independently computed content address to the one received from the storage system to verify that they match.

In the illustrative configuration of FIG. 4, storage system 407 is a distributed storage system including a plurality of access nodes 409a, 409b, 409c, and 409d and a plurality of storage nodes 411a, 411b, 411c, and 411d. The access nodes 409 and storage nodes 407 may be coupled in any suitable way, such as by a communications network (not shown) that employs the TCP/IP network protocol. Each access node 409 and storage node 411 may be, for example, a separate computer having independent hardware and software resources (i.e., processor or processors, memory, disk resources, operating system, storage system software), although the aspects of the present invention are not limited in this respect.

As mentioned above, host computer 401 issues access requests (e.g., reads, writes or other requests) to one of access nodes 409. In the case of write requests, access nodes 409 may receive the write request (and the data to be written) from the host computer, select a storage node 411 to store the data, and send the data to that storage node for storage. In some embodiments, access nodes 409 may select a storage node 411 in any suitable manner. For example, access nodes 409 may employ a load balancing scheme to distribute data evenly across the storage nodes, or access nodes 409 may employ a different selection technique. As mentioned above in connection with FIG. 2, when storing a unit of data, a storage node may create a file having the content address of the unit of data as its filename and may store the unit of data in that file.

In the case of read requests, access nodes 409 may receive the request from the host computer, determine on which storage node 411 the requested data is stored, retrieve the requested data from the appropriate storage node 411, and return the requested data to the host computer. The aspects of the present invention described herein are not limited to this or any other particular configuration, as any suitable configuration of the storage system can be employed. For example, rather than having the access nodes retrieve the requested data from storage nodes and forward the data to the host 401, the storage system could alternatively be configured so that the access node simply instructs the storage node to return the data directly to the host 401.

Storage nodes 411 may receive read and write requests from access nodes 409 and, in response, retrieve and store data. As such, storage nodes 411 may include one or more storage devices (e.g., disk drives or any other type of storage device) on which units of data are stored. It should be appreciated that access nodes 409 may also include one or more storage devices, such that access nodes 409 and storage nodes 411 may have the same (or approximately the same) or different hardware configurations.

FIG. 4 illustrates a storage system having four access nodes and four storage nodes. However, it should be appreciated that this configuration is merely illustrative, as the storage system may include any suitable number of access nodes and any suitable number (which may differ from the number of access nodes) of storage nodes, as the invention is not limited to use on a storage system configured in any particular manner in this respect.

Further, it should be appreciated that while the example of FIG. 4 includes access nodes with which host computers communicate to access the storage system and storage nodes that store the units of data, the invention is not limited in this respect. For example, the storage system may include nodes which both communicate with host computers and store units of data. That is, one or more nodes may serve (at least in part) as both a storage node and access node.

Location Hints

In one embodiment of the invention, the storage system may provide location hints to the host to increase the efficiency of accesses to the storage system. A location hint is information provided from the storage system to the host and relating to where a particular unit of data is stored on the storage system. The information provided in the location hint can then be passed back from the host to the storage system in connection with future access requests for the unit of data, and the information can be used by the storage system to efficiently access the unit of data. The location hint for a particular unit of data may include information regarding the storage node on which the unit of data is stored, the physical storage device on that storage node that stores the unit of data, the file system location of the file containing that unit of data on that physical storage device, the location on the physical device of which the unit of data is stored, or any combination thereof. In addition, as opposed to information that directly identifies one or more aspects of the physical storage location for the unit of data, the information provided in a location hint can be related to where the unit of data is physically stored in other ways. For example, the storage system could include a index of the physical storage location for units of data and the location hint provided to the host could provide a key into this index. Thus, the information provided in the location hint can be related to where the unit of data is physically stored in any suitable way.

The storage system may provide the location hint to the host in any one of a variety of ways, as the invention is not limited in this respect. For example, in response to a write request from the host computer to write a unit of data, the storage system may return the location hint information (e.g., as a token or in any form) for the unit of data. The location hint may be the only information returned, or it may be sent back to the host with other information returned to the host in response to a write request. For example, in one embodiment, the storage system responds to a write request by returning the content address (e.g., the MD5 hash value) corresponding to the unit of data so that the host may verify that the storage system has computed the content address correctly. In one embodiment, when returning the content address to the host in response to the write request, the storage system may also send the location hint, as shown conceptually at 406 in FIG. 4.

The storage system may also provide location hint information to the host in response to a read request. For example, when the storage system returns the requested unit of data to the host, the storage system may also send the location hint information for the requested unit of data.

The storage system may also provide location hint information to the host in response to query requests, or any other type of request. A query request is a request to the storage system in which a host may request units of data based on information about the units of data. Such information may be, for example, the time at which the units of data were stored on the storage system, part of the metadata stored in a CDF, a partial content address, or any other suitable information.

For example, instead of providing a content address to the storage system (as in a typical read request), the host may provide a time range (e.g., a start time and an end time) to the storage system. In response, the storage system returns to the host a list of the content addresses corresponding to units of data that were stored on the storage system during the period of time indicated by the time range. The storage system may send location hint information to the host for each of the units identified in response to the query request. Providing location hints in response to a query request may be useful because it is likely that the host will issue read requests for at least some of the content addresses returned by the storage system in response to the query request. If the host can inform the storage system of the location of the units of data corresponding to these content addresses (i.e., from the location hint), computational resources (and time) on the storage system expended in locating the units of data on the storage system can be reduced.

As mentioned above, the information that may be provided to the storage system in a query request is not limited to a time range. The information may additionally or alternatively include part of the metadata stored in a CDF, a partial content address, or any other suitable information. For example, if the query request includes metadata stored in a CDF or a partial content address, the storage system may return the content addresses of any CDFs that include the specified metadata or partial content address.

The host may use the location hint information received from the storage system in any of a variety of ways, as the invention is not limited in this respect. As mentioned above, an application program 403 (FIG. 4) executing on the host may communicate with the storage system through an API 405. When the API receives a location hint from the storage system (e.g., in response to a read, write, query request, or other access request), the API may provide the location hint to the application program. The application program may then store the location hint information in a manner that associates it with the corresponding content address. Thus, the next time the application program requests access to the unit of data corresponding to that content address (i.e., through the API), the application program may provide the location hint information along with the content address.

Alternatively, instead of passing the location hint information to the application program, the API may store the location hint information itself. Thus, the API may receive from the application program a request to access a unit of data on the storage system, with the request including the content address for the desired unit of data. The API may determine if it has stored a location hint corresponding to that content address. If so, the API may provide the location hint to the storage system along with the access request.

The host (e.g., the API or the application program) may store the location hint information in any suitable manner. In one embodiment, the host (e.g., the API) maintains a cache of stored location hints and their corresponding content addresses for performance reasons. When the cache is full, the API or application program may replace items in the cache using a least-recently used replacement scheme, most-recently used replacement scheme, or any other suitable cache replacement scheme.

It should be appreciated that the use of location hints shifts some of the computational burden of locating data on the storage system from the storage system to the host, as the host computer maintains and accesses records of location information. When issuing an access request to the storage system, the host computer may search these records and provide location information, if available, to the storage system. This enables the storage system to avoid at least some of the searching of records on the storage system to determine the physical location for a stored data unit.

In another embodiment, the host may simply ignore any location hints that it receives from the storage system. That is, the host may choose not to bear any of the computational burden of locating data and may rely on the storage system to locate the content.

In another embodiment, the use of location hints is provided as an optional feature to the host, such that the feature can be turned on or off.

It should be appreciated that the location hint information can be determined by the storage system in any of numerous ways, as the present invention is not limited to any particular implementation technique. In accordance with one embodiment of the present invention for use with a storage system having the configuration shown in FIG. 4, the location information can be generated by the access nodes 409 and possibly also by the storage nodes 411 depending upon the granularity of the location information provided. In this respect, and as discussed above, the location information can be provided in any of numerous levels of granularity, as the present invention is not limited in this respect. For example, the location information can provide a hint only as to which access node controls access to the physical storage location, or can provide additional information relating to a specific storage node that stores the unit of data. Similarly, the information relating to the particular storage node that stores the unit of data can also be provided at numerous levels of granularity, as this information can merely identify the storage node, or can alternatively be more descriptive and can identify a file system location and optionally also a particular storage device (e.g., disk drive) on which the unit of data is stored. It should be appreciated that in response to an access request, it is a fairly simple process for the storage system to generate the location information, because, as of a result of accessing the unit of data, the storage system will go through the process of determining the physical storage location and will have this information available to provide in a hint to the host. For example, in one embodiment of the present invention, when a unit of data is accessed, the storage node on which the data is stored identifies to the appropriate access node the file system and disk drive on which the data is stored, and the access node then passes this information along to the host in the form of the location hint described above. It should be appreciated that the levels of granularity and the manner in which the location information is generated is not limited to the examples described herein, nor to a storage system having the type of configuration shown in FIG. 4, as this aspect of the present invention can be used in connection with numerous other types of storage system configurations, including those that do not employ an access node and storage node structure.

If location hints are not used (i.e., the feature is turned off), or if the host does not have location information for a particular unit of data, the storage system may use a multi-cast location query, BLI lookup, or any other suitable technique to locate the data. Further, in some circumstances, a location hint may not correctly identify the location of the content on the storage system. Such a situation may occur, for example, when the storage system moves the content to a new location after the host has received the location hint. If a location hint fails to identify the correct location of the content on the storage system, the storage system may use another method of locating the content, such as MLQ, BLI lookup, or any other suitable technique.

BLI Caching

In one embodiment of the invention, the storage system maintains a data set (e.g., a database) referred to as a blob location index (BLI) that works in the manner of the BLI described above in connection with a known system. In one embodiment, the responsibility of administering the BLI is distributed among storage nodes 411 (FIG. 4), with each having a designated range of addresses (e.g., content addresses) that it is responsible for and an index for the addresses in that range to identify where the corresponding data units are stored. The BLI itself (in addition to the administration responsibilities) may also be distributed across multiple nodes of the storage system. To increase the efficiency of accesses to the BLI, portions of the BLI are cached in accordance with one embodiment of the invention.

The blob location index may be a database (or other data set) that maps, for units of data stored on the storage system, the content address corresponding to the unit of data to the storage node on which the unit of data is stored. The BLI may be stored in its entirety on one storage node (and optionally mirrored on one or more other storage nodes) or may be distributed among two or more storage nodes as discussed above. In response to an access request to a particular address, the access node 409 that receives the request directs it to a storage node 411 that administers the portion of the BLI that includes that address, and the BLI is read by the appropriate storage node to determine the location of the requested unit of data on the storage system.

It should be understood that the administration of a single portion of the BLI may be shared by more than one storage node, in which case the access node 409 may direct such requests to one or all of the storage nodes that administer that portion of the BLI.

It should also be understood that in some embodiments of the invention, storage of the BLI or administration of the BLI may be performed by both access nodes and storage nodes, or solely by access nodes, as the invention is not limited in this respect. It should further be appreciated that the techniques discussed below for caching portions of the BLI are equally applicable to both access nodes and storage nodes.

In the prior art system, the BLI is stored in secondary memory (e.g., magnetic disk), which is slower to access than primary memory. When the access request is a write request for a new unit of data with no entry on the BLI, the BLI is updated to include the content address and storage node location of the newly stored data. The storage system waits for the BLI to be updated before indicating to the host that the write has been successfully completed. If the portion of the BLI to be updated is not already in the primary memory of the storage node, the storage node updating the BLI performs a disk read to read the BLI into primary memory (i.e., RAM), updates the BLI in primary memory, and then performs a disk write to write the updated BLI back to disk. Thus, from the point of view of an application program, there is some latency from the time a write request is issued to the time that the storage system confirms a successful write and returns the content address of the written data, and this latency is increased when the confirmation is not returned until the BLI is updated.

In accordance with one embodiment of the invention, the storage system maintains a BLI cache in primary memory (e.g., RAM) to provide for improved access performance. For example, in response to a write request, the storage system can write the new entry into the BLI cache in primary memory and respond to the requesting host that the write has completed successfully. The contents of the BLI cache can be destaged to the BLI on disk at a later time. As a result, the latency caused by updating the BLI is reduced.

The BLI cache also increases the efficiency of the read accesses to the storage system. When a read request is received, the storage system may search the BLI cache to determine if location of the requested unit of data is stored in the BLI cache. If it is, the need for a disk read to the BLI is obviated.

The BLI cache can be arranged and stored in any suitable manner as the present invention is not limited to any particular implementation technique. For example, when the BLI is stored entirely on a single storage node, the BLI cache may be maintained entirely on the same storage node or distributed among multiple storage nodes. Similarly, when the BLI is distributed across multiple storage nodes, one storage node may be used to store the BLI cache or each storage node could store the portion of the BLI cache (412a-d in FIG. 4) corresponding to the portion of the BLI stored by that storage node.

It should be understood that the above described locations of the BLI cache are given only as examples, as the BLI cache may be located anywhere in the storage system and/or distributed across the storage system in any manner, with entries of a distributed BLI cache not necessarily being limited to being on the same machine as corresponding entries for the BLI. It should further be appreciated that the BLI cache may be destaged to the BLI in any suitable manner, as the invention is not limited in this respect. For example, entries in the BLI cache may be destaged to the BLI whenever the BLI cache is full according to any suitable replacement algorithm. Alternatively, BLI cache entries may be destaged to the BLI during periods of light processor usage within the storage system. As yet another alternative, BLI cache entries may be destaged to the BLI after a fixed period of time has elapsed.

In one embodiment, access nodes may also cache BLI entries, either instead of or in addition to storing BLI cache entries on the storage nodes. When an access node processes a write request from a host, the access node selects on which storage node the data is written, so the access node has this information along with the content address of the newly written data and can add it in its BLI cache. In one embodiment, after the storage node stores the newly written data, it can return information to the access node regarding the file system and disk on the storage node where the data is stored so that this information also can be added to the cache entry on the access node. It should be appreciated that the present invention is not limited in this respect, as the BLI cache entries can, alternatively, identify only the storage node on which the data units are stored.

When the access node receives a read request, it may search for the requested content address in its BLI cache. If there is a cache hit (i.e., the content address is found in the cache), then the access node need not query the BLI on the storage system, as the access node determines the storage location for the requested unit of data from its own BLI cache. Thus, the response time in returning the requested unit of data may be further reduced.

It should be appreciated that the BLI cache on the access nodes can be used with or without another layer of BLI caching on the storage nodes. It should also be understood that the BLI, as described above, maps content addresses to storage nodes which store the units of data corresponding to those content addresses. However, the BLI may also include information about the particular physical disk device and/or file system location of the unit of data, as the invention is not limited in this respect.

In one embodiment, BLI caching is provided as an optional feature to the user of the storage system, such that the feature can be turned on or off.

As discussed above, when a new unit of data is written to the storage system, in addition to writing the data to a storage node and updating the metadata in the storage system that relates to where the unit of data is stored, in the embodiment that employs a BLI cache, the BLI cache may be updated as well. As further mentioned above, the updating of numerous areas in the storage system may provide some latency in terms of when a confirmation is sent from the storage system to the host that a write request has been processed. In accordance with one embodiment of the present invention, the write to the BLI cache can be done after the confirmation is provided to the host, as the failure to have an entry in the BLI cache for a unit of data will only impact the performance of a future access to the unit of data, but will not preclude the unit of data from being accessed by the storage system. In a further embodiment of the present invention, the confirmation can also be provided even before any appropriate entries are written to the BLI, to further improve write performance. In this respect, it should be appreciated that in accordance with one embodiment of the present invention, if an access request is received to read data and no corresponding entry is provided in the BLI, the storage system may issue a multicast location query for the unit of data to see whether it is stored on any of the storage nodes. Thus, in accordance with this embodiment of the present invention, the storage system is able to locate units of data even if they do not include a corresponding entry in the BLI.

It should be appreciated that the above discussion relating to implementing a cache of a location index in a content-addressable storage system having the configuration shown in FIG. 4 is provided merely for illustrative purposes, and that the present invention is not limited in this respect. The aspect of the present invention relating to the use of a cache for a location index in a content-addressable storage system can be employed with storage systems having configurations other than the access node/storage node configuration shown in FIG. 4.

Furthermore, it should be appreciated that the aspects of the present invention relating to caching a location index and the use of a location hint that can be passed to the host computer are not mutually exclusive, and that these two features can be used together as well as separately.

Intrinsic Locations

Figure 5:
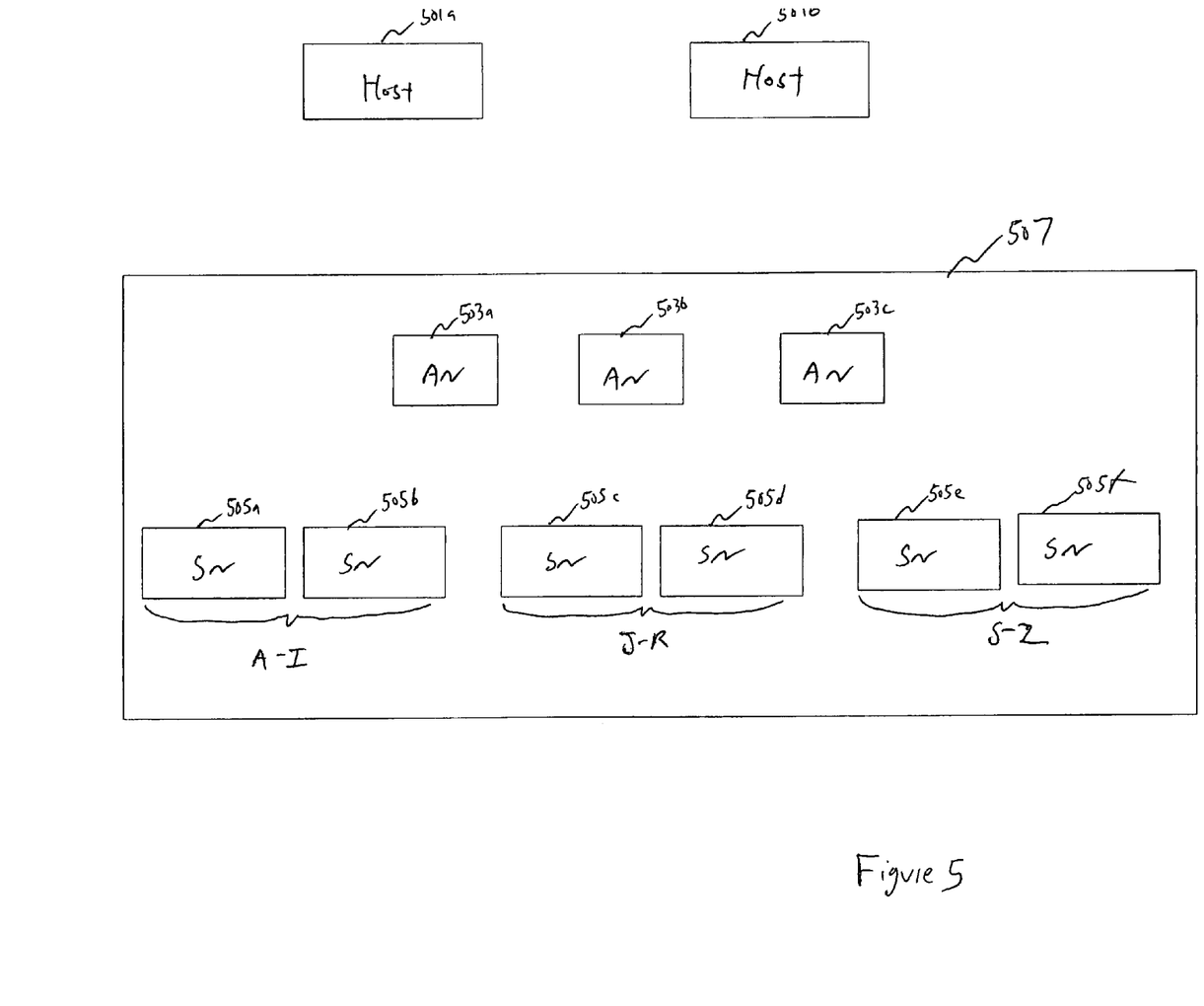
FIG. 5 is a block diagram illustrating intrinsic locations assigned to a plurality of storage nodes in accordance with one embodiment of the invention.

An alternate embodiment uses a technique (referred to herein as intrinsic locations) that employs at least a portion of the content address to determine at least one aspect of the storage location for units of data on the storage system. FIG. 5 shows an illustrative storage system 507 using intrinsic locations. Storage system 507 includes a plurality of access nodes 503a, 503b, and 503c and a plurality of storage nodes 505a, 505b, 505c, 505d, 505e, and 505f. The storage nodes may be divided into groups such that each group of storage nodes is assigned a range of content address. In the example of FIG. 5, storage nodes 505a and 505b are assigned content addresses beginning with characters 'A'-'I', storage nodes 505c and 505d are assigned content addresses beginning with characters 'J'-'R', and storage nodes 505e and 505f are assigned content addresses beginning with characters 'S'-'Z'. In FIG. 5, each group of storage nodes includes two storages nodes. However, it should be understood that a storage node group may include only one storage node or may include three or more storage nodes. Further, it is not necessary that each group of storage nodes include an equal number of storage nodes.

In one embodiment, each group of storage nodes stores the data units corresponding to its assigned range of content addresses. Access nodes 503 maintain information of which range of content addresses are assigned to each group of storage nodes and, as such, may select the appropriate storage node to access units of data in response to an access request.

For example, if access node 503a receives from host 501a a request to write a unit of data whose content address begins with the character 'J', access node will select either storage node 505c or 505d to store the data. In one embodiment, access node 503a selects one of these two storage nodes based on another part of the content address. For example, access node 503a may examine the second character of the content address to select the appropriate storage node within the selected group. For example, storage node 505c may store data units whose content addresses have a second character of 'A'-'M' and storage node 505d may store data units whose content addresses have a second character of 'N'-'Z'. It should be appreciated that any character(s) in the content address may be used to select the appropriate storage node within a group of multiple storage nodes, as the invention is not limited in this respect.

Figure 6:
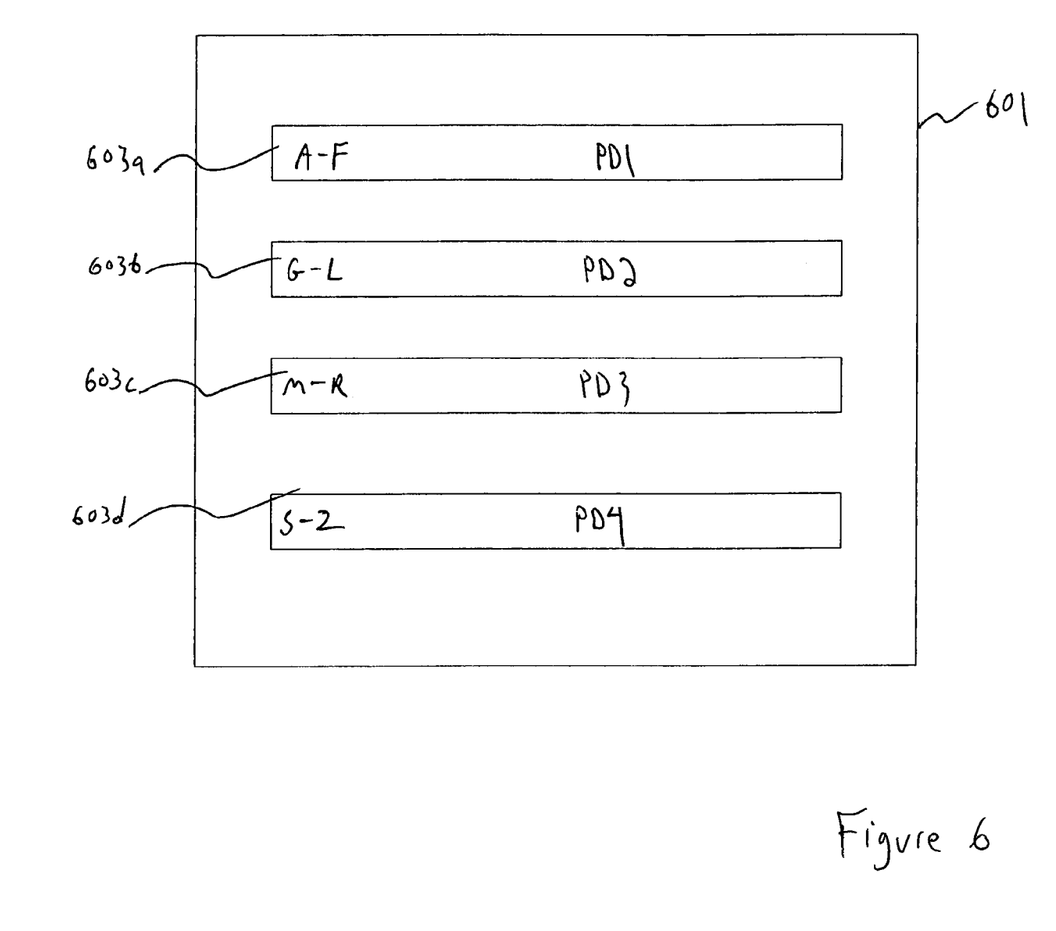
FIG. 6 is a block diagram illustrating intrinsic locations assigned to a plurality of storage devices within a storage node, in accordance with one embodiment of the invention.

Once access node 503a has selected a storage node to store the unit of data, the selected storage node may select a physical storage device (e.g., disk) on which to store the unit of data. FIG. 6 conceptually shows a storage node 601 having four physical storage devices, 603a, 603b, 603c, and 603d. The storage node 601 may select one of these storage devices to store a unit of data based on one or more characters in the content address. For example, storage node 601 may select one of the storage devices 603 based on the third character of the content address. If the third character of the content address is 'A'-'F', storage device 603a may store the data. If the third character is 'G'-'L', storage device 603b may store the data. If the third character is 'M'-'R', storage device 603c stores the data. If the third character is 'S'-'Z' storage device 603d stores the data.

By selecting the physical storage location (e.g., storage node and storage device) of a unit of data based on the content address of the unit of data, an access node may later determine the physical location without a database lookup or multicast location query. That is, the access node may simply examine the content address and determine the location of the unit of data based on the content address.

While the illustrative example described above uses the intrinsic location technique to determine not only the storage node on which a unit of data is stored based upon its content address, but also the file system and storage device within that node, it should be appreciated that the aspect of the present invention relating to the use of intrinsic locations is not limited in this respect, as it can be employed to determine only some aspects of the physical storage location of a unit of data but not others. For example, the intrinsic locations technique could alternatively be used to select only a storage node on which a unit of data is stored, and to thereby eliminate the need to perform lookups or broadcast queries to determine the storage node, but the determination of the file system and/or physical storage device on which the unit of data is stored can be performed in other ways, including through the use of indexing techniques as described above.

Applicants have appreciated that for some units of data, it may be desirable to not store them in the particular physical storage location specified for the unit of data by the intrinsic locations technique based upon its content address, and Applicants have developed a technique to address such units of data. This can occur for any of numerous reasons, an example of which is a particularly large unit of data. For a large unit of data, there may not be room on the physical storage location specified by the mapping performed by the intrinsic locations technique to store the data, or it may be preferable to store it elsewhere for load balancing purposes. In addition, some application programs that write a particularly large unit of data to a storage system may wish to begin the write operation before generating a content address based upon the entire unit of data, such that the write operation may begin for a unit a data before the content address has been determined. Thus, when the intrinsic locations technique is employed, there may not be a content address to determine where to store the unit of data when the unit of data is passed to the storage system. In accordance with one embodiment of the present invention, the above-described situations can be addressed by using the intrinsic locations technique and pointers. For example, if it is desired to store a unit of data (e.g., a relatively large one) in a location other than that specified by the intrinsic location mapping technique described above, a pointer can be stored in the storage location specified by the content address for the unit of data, with the pointer pointing to another physical storage location at which it is more desirable to store the unit of data. Thus, when future access requests are received for the unit of data, the intrinsic location mapping techniques will map to the pointer for the unit of data, which can then be read and used to retrieve the data.

The pointer technique can also be employed when handling a write request for a unit of data for which no content address has yet been generated. In this respect, when the unit of data is received, the storage location can place it in any suitable storage location, and then once the content address for the unit of data is determined and/or provided, a pointer can be placed in the appropriate location determined by the intrinsic location mapping technique for the newly provided content address, with the pointer pointing to the storage location that was chosen for the unit of data. Of course, it should be appreciated that the data could alternatively be moved to the storage location specified by the intrinsic location mapping technique once the content address is provided.

Further, in one embodiment, in which the pointer technique is used to store data, the storage system may execute a background process that periodically searches the storage system for pointers pointing to other storage locations at which units of data are stored. If any such pointer is found, the process may move the unit of data from the storage location pointed to by the pointer to the storage location specified by the intrinsic location mapping (i.e., the location of the pointer), thereby replacing the pointer with the corresponding unit of data. Thus, the storage system's efficiency in accessing the units of data (e.g., in response to a read request from a host computer) may be increased, as the storage system need not access both the storage location of the pointer and the storage location of the unit of data.

It should be understood that the background process for replacing pointers with their corresponding units of data may be executed on any the storage system in any suitable way. For example, the process may be executed only on storage nodes that are idle. Alternatively, the process may be executed on every storage node after a predetermined period of time has elapsed. Many other alternatives are available and the invention is not limited in this respect.

In accordance with one embodiment of the present invention, if a unit of data cannot be found using the intrinsic location technique, alternative look up techniques can be employed, such as performing a multicast location query.

Temporal Locality of Reference

As mentioned above, in one embodiment, units of data are stored in files on a file system of the corresponding storage node. Such files may have a filename corresponding, at least in part, to the content address of the unit of data stored therein, and the file system may be organized in directories and subdirectories with the name of the subdirectory in which a particular unit of data is stored corresponding at least in part to at least a portion of the filename of the unit of data. As mentioned above, the file system may be organized based on the first characters of the content addresses of the units of data stored in the file system. However, it should be appreciated that the invention is not limited in this respect, as the file system may be organized using any portion of the content address including, but not limited to, the first letters or bits, the middle portion, or the end portion. The hashing algorithm used to generate content addresses may yield fairly random values (as is the case with the MD5 hashing algorithm). As a result Applicants have appreciated that units of data written at approximately the same time may be stored in different locations in the file system hierarchy. That is, despite the fact that the units of data are written in close proximity in time, these units of data may be scattered across the file system. Thus, the randomness of the hashing algorithm precludes any locality of reference in the file system.

Operating systems typically maintain a file system map that maps file system locations to physical disk locations. When the file system is large (i.e., a large hierarchy of directories and subdirectories) and there are many files stored in the file system, the file system map maintained by the operating system may also be quite large. As a result, the operating system may only keep a small portion of the file system map in the primary memory (e.g., RAM) of the storage node at one time. The rest of the file system map may remain in secondary memory (e.g., disk). As various portions of the file system map are needed (i.e., when files are accessed), they may be brought into primary memory, with other portions being swapped out to disk. It should be appreciated that access performance is better when accessing portions of the file system in memory rather than disk.

If two units of data are written to the storage node proximate in time but stored in different portions of the file system map, the operating system first must load from disk the portion of the file system map having the file system location of the first unit of data (i.e., to determine the physical disk location of that unit of data) and then must return to disk to load the portion of the file system map having the file system location of the second unit of data. These repeated disk accesses slow the write response time of the storage system. In addition, since units of data written proximate in time are also often read proximate in time, a similar access delay may be encountered when reading the data units.

Applicants have appreciated that in a storage system that employs a file system structure, it is desirable to store units of data that are stored at approximately the same time in the approximately the same file system location, to minimize the likelihood of the operating system having to go to disk to load different portions of the file system for sequentially accessed data units. As mentioned above, in one embodiment of the invention, the file system location of a file is determined based on the filename of the file. Thus, in accordance with one embodiment of the invention, information is added to the filename of the file that is similar for files written at approximately the same time. This provides temporal locality of reference for files written at approximately the same time, and tends to result in those filed being stored in proximate file system locations.

It should be appreciated that in embodiments of the invention that employ content addressable storage, the information that is added to the filename of the file may also be added to the content address of the data stored in the file. For example, the information may be added to the hash of the content of the file to generate a content address based on the hash and the additional information. The information may be added at any suitable position in the hash. For example, the information may be added to the beginning, the end, or at any other position in the hash. The host computer may use the content address to access the file in the manner described above.

In one embodiment of the invention, the information added to establish temporal locality of reference may be added to the content address at the storage system. That is, for example, when a unit of data is stored to the storage system, the storage system may generate the temporal locality of reference information, include the information in the hash, and return the resulting content address to the host computer that submitted the storage request.

In an alternate embodiment, the host computer generates the temporal locality of reference information and adds the information to the hash to generate the content address. The host computer may send the content address to the storage system or may just send the temporal locality of reference information to the storage system and allow the storage system to add the information to the hash to determine the content address. By computing the temporal locality of reference information at the host computer, if the host computer stores the unit of data on multiple storage systems at the same time (or approximately the same time), e.g., for backup or replication purposes, the content address for the unit of data is the same on each of the storage systems.

In another embodiment, temporal locality of reference information may be generated by the storage system and the host computer, and both sets of information may be added to the hash, at any suitable position in the hash, to generate the content address of the unit of data.

The above example was described as providing temporal locality of reference with respect to files stored in a file system. However it should be appreciated that such a technique is applicable to other logical data storage constructs. For example, adding temporal locality of reference information to content addresses (or other information stored in a database) may increase access efficiency of database tables that are accessed using a content address (or other information) as a key, and can also be used with other logical constructs.

The information added to the filename may be any information that is similar for data units written at approximately the same time. For example, a timestamp may be added to the file names, and the timestamp can be examined by the file system in determining where to store the data units. Alternatively, a counter value may be added to the file names with the counter value being incremented each time a new data unit is written to the storage system. Again, any suitable information may be used, as the invention is not limited in this respect.

It should be appreciated that the aspect of the present invention that relates to adding information to a content address that provides an indication of which units of data are written to the storage system proximate in time is not limited to a storage system having the particular access node and storage node configuration described, or to employing a file system on the storage node as described above, as this aspect of the present invention can be used in connection with storage systems having numerous different configurations.

Figure 7:
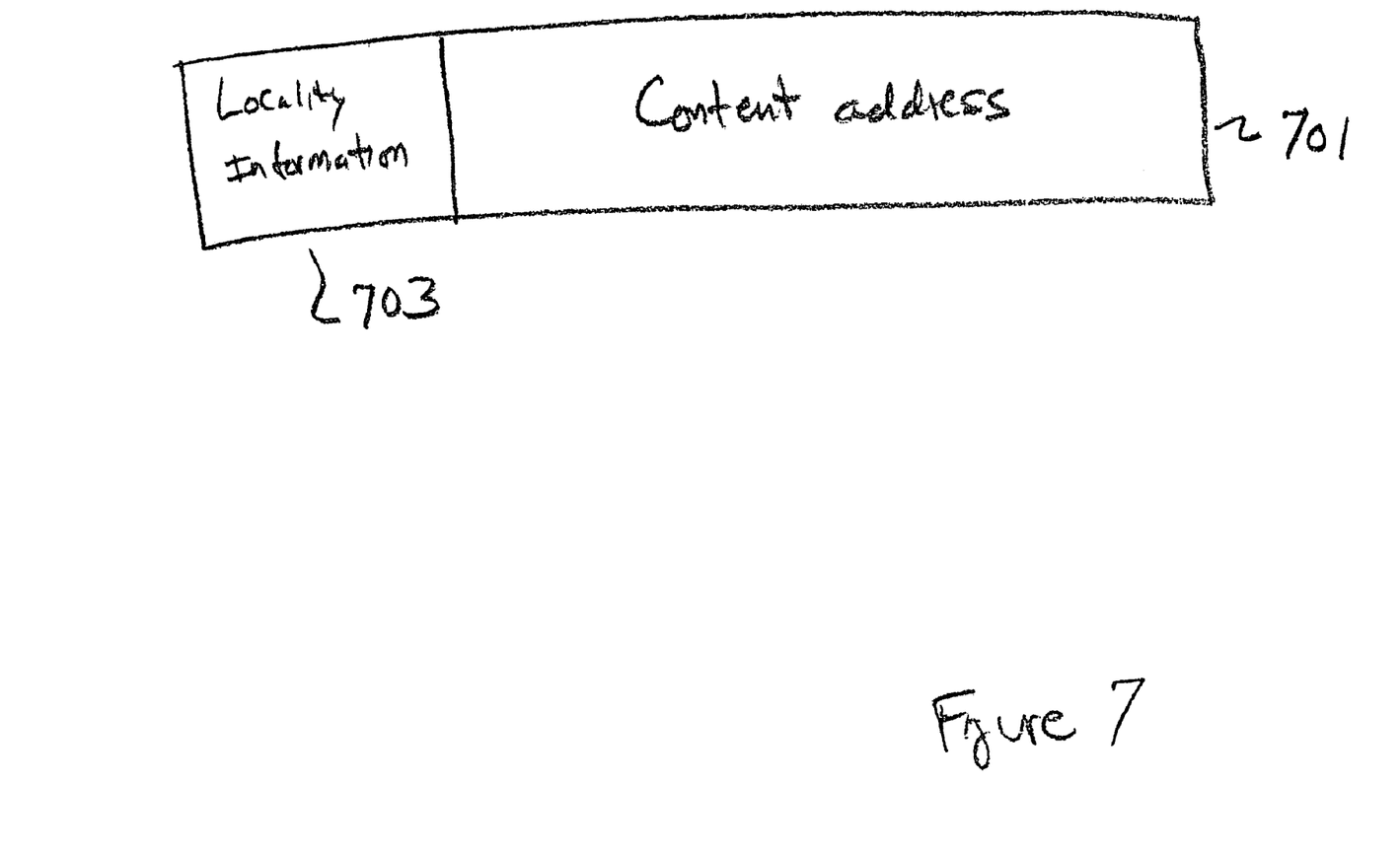
FIG. 7 illustrates locality information being added to the content address for a unit of data in accordance with one embodiment of the present invention.

FIG. 7 conceptually illustrates the temporal locality of reference aspect of the present invention, as it illustrates locality information 703 being added to a content address 701. It should be appreciated that this aspect of the present invention is not limited to providing locality information at the beginning of the content address as shown in FIG. 7, as the locality information can be added to the content address in any suitable manner, including providing it at the end of the content address, or within the range of the content address, and including providing locality information as a contiguous block as shown in FIG. 7, or dispersed throughout the content address information 701.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

In various examples described above, content addresses were described to include alphabetic characters 'A'-'Z'. It should be understood that these content addresses were given only as examples, and that content addresses may include any alphanumeric character, series of bits, or any other suitable character, as the invention is not limited in this respect.

The phraseology and terminology used herein is for the purpose of description and should not be regarded as limiting. The use of "including," "comprising," or "having," "containing", "involving", and variations thereof herein, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of processing data in a computer system comprising at least one host and at least one content addressable storage system which stores units of data for the at least one host, wherein the at least one host accesses a unit of data using a content address based at least in part on the content of the unit of data, the method comprising acts of:
    (a) creating the content addresses for units of data to comprise first information that provides an indication of which units of data are written to the storage system proximate in time, wherein the act (a) comprises, for at least one of the units of data, acts of:
        creating a hash of at least a portion of the unit of data; and
        adding the first information to the hash to create the content address for the one of the units of data;
    (b) accessing one of the units of data by providing the content address for the one of the units of data to the storage system; and
    (c) considering the first information the content address for the one of the units of data in determining where within the storage system to store the one of the units of data.

2. The method of claim 1, wherein the act of adding the first information to the hash further comprises creating the first information at the at least one host.

3. The method of claim 1, wherein the act of adding the first information to the hash further comprises creating the first information at the at least one storage system.

4. The method of claim 1 wherein the act of adding the first information to the hash further comprises creating the first information at the at least one storage system and the at least one host.

5. The method of claim 1, wherein the first information includes at least a portion of a timestamp relating to when the one of the units of data is written to the at least one storage system.

6. The method of claim 1 wherein the act, (b) comprises an act of using at least a portion of the first information to select a storage location within the at least one storage system for storing the one of the units of data, and wherein the method further comprises an act of storing the one of the units of data in the selected storage location.

7. The method of claim 1, wherein the first information is used by the at least one content addressable storage system to select a storage location within the at least one content addressable storage system for storing at least one of the units of data and wherein the storage location is a logical storage location within a file system on the at least one storage system.

8. The method of claim 1, wherein the method further comprises using the first information as a key to a database table.

9. The method of claim 1, wherein the first information is used by the at least one content addressable storage system to select a storage location within the at least one content addressable storage system for storing at least one of the units of data and wherein the storage location is a physical storage location within the at least one storage system.

10. At least one computer readable medium encoded with instructions that, when executed on a computer system perform a method of processing data, wherein the computer system comprises at least one host and at least one content addressable storage system which stores units of data for the at least one host, and wherein the at least one host accesses a unit of data using a content address based at least in part on the content of the unit of data, the method comprising acts of:

(a) creating the content addresses for units of data to comprise first information that provides an indication of which units of data are written to the storage system proximate in time, wherein the act (a) comprises, for at least one of the units of data, acts of:
  creating a hash of at least a portion of the unit of data; and
  adding the first information to the hash to create the content address for the one of the units of data;
(b) accessing one of the units of data by providing the content address for the one of the units of data to the storage system; and
(c) considering the first information the content address for the one of the units of data in determining where within the storage system to store the one of the units of data.

11. The at least one computer readable medium of claim 10, wherein the act of adding the first information to the hash further comprises creating the first information at the at least one host.

12. The at least one computer readable medium of claim 10, wherein the act of adding the first information to the hash further comprises creating the first information at the at least one storage system.

13. The at least one computer readable medium of claim 10, wherein the act of adding the first information to the hash further comprises creating the first information at the at least one storage system and the at least one host.

14. The at least one computer readable medium of claim 10, wherein the first information includes at least a portion of a timestamp relating to when the one of the units of data is written to the at least one storage system.

15. The at least one computer readable medium of claim 10, wherein the act (b) comprises an act of using at least a portion of the first information to select a storage location within the at least one storage system for storing the one of the units of data, and wherein the method further comprises an act of storing the one of the units of data in the selected storage location.

16. The at least one computer readable medium of claim 10, wherein the first information is used by the at least one content addressable storage system to select a storage location within the at least one content addressable storage system for storing at least one of the units of data and wherein the storage location is a logical storage location within a file system on the at least one storage system.

17. The at least one computer readable medium of claim 10, wherein the method further comprises using the first information as a key to a database table.

18. The at least one computer readable medium of claim 10, wherein the first information is used by the at least one content addressable storage system to select a storage location within the at least one content addressable storage system for storing at least one of the units of data and wherein the storage location is a physical storage location within the at least one storage system.

* * * * *